(12) United States Patent
Oono

(10) Patent No.: US 6,938,160 B2
(45) Date of Patent: Aug. 30, 2005

(54) NETWORK SERVICE USER AUTHENTICATION SYSTEM

(75) Inventor: Masayoshi Oono, Saitama (JP)

(73) Assignee: Oki Electric Industry Co., Ltd., Tokyo (JP)

(*) Notice: Subject to any disclaimer, the term of this patent is extended or adjusted under 35 U.S.C. 154(b) by 907 days.

(21) Appl. No.: 09/749,939

(22) Filed: Dec. 29, 2000

(65) Prior Publication Data

US 2001/0018748 A1 Aug. 30, 2001

(30) Foreign Application Priority Data

Feb. 28, 2000 (JP) .......................................... 2000-050855

(51) Int. Cl.⁷ ............................. H04L 9/32; G06F 17/60
(52) U.S. Cl. ............................. 713/186; 705/64; 705/67; 705/75
(58) Field of Search ............................. 713/200, 186; 705/44, 64, 67, 75

(56) References Cited

U.S. PATENT DOCUMENTS

| | | | | |
|---|---|---|---|---|
| 5,615,277 A | * | 3/1997 | Hoffman | .................... 382/115 |
| 6,474,548 B1 | * | 11/2002 | Montross et al. | ........... 235/379 |
| 2001/0051924 A1 | * | 12/2001 | Uberti | ......................... 705/44 |
| 2002/0073416 A1 | * | 6/2002 | Ramsey Catan | ............... 725/6 |
| 2002/0095386 A1 | * | 7/2002 | Maritzen et al. | .............. 705/64 |

* cited by examiner

*Primary Examiner*—Matthew Smithers
(74) *Attorney, Agent, or Firm*—Rabin & Berdo, P.C.

(57) ABSTRACT

A network service user authentication system is provided to properly authenticate an authorized user in a transaction using a network. The system includes an includes an authentication part which preserves vital information for confirming a user and issues authentication information on the user by collating vital information supplied from outside through a network with the preserved vital information, and a payment part of a financial institution which, upon receiving the authentication information on the user issued by the authentication part, performs the payment admission of an amount to be paid to a provider server which provides a commodity or a service to the user through the network.

7 Claims, 5 Drawing Sheets

SCHEMATIC VIEW EXPLAINING FIRST TRANSACTION PROCEDURE

SCHEMATIC VIEW EXPLAINING REGISTRATION PROCEDURE

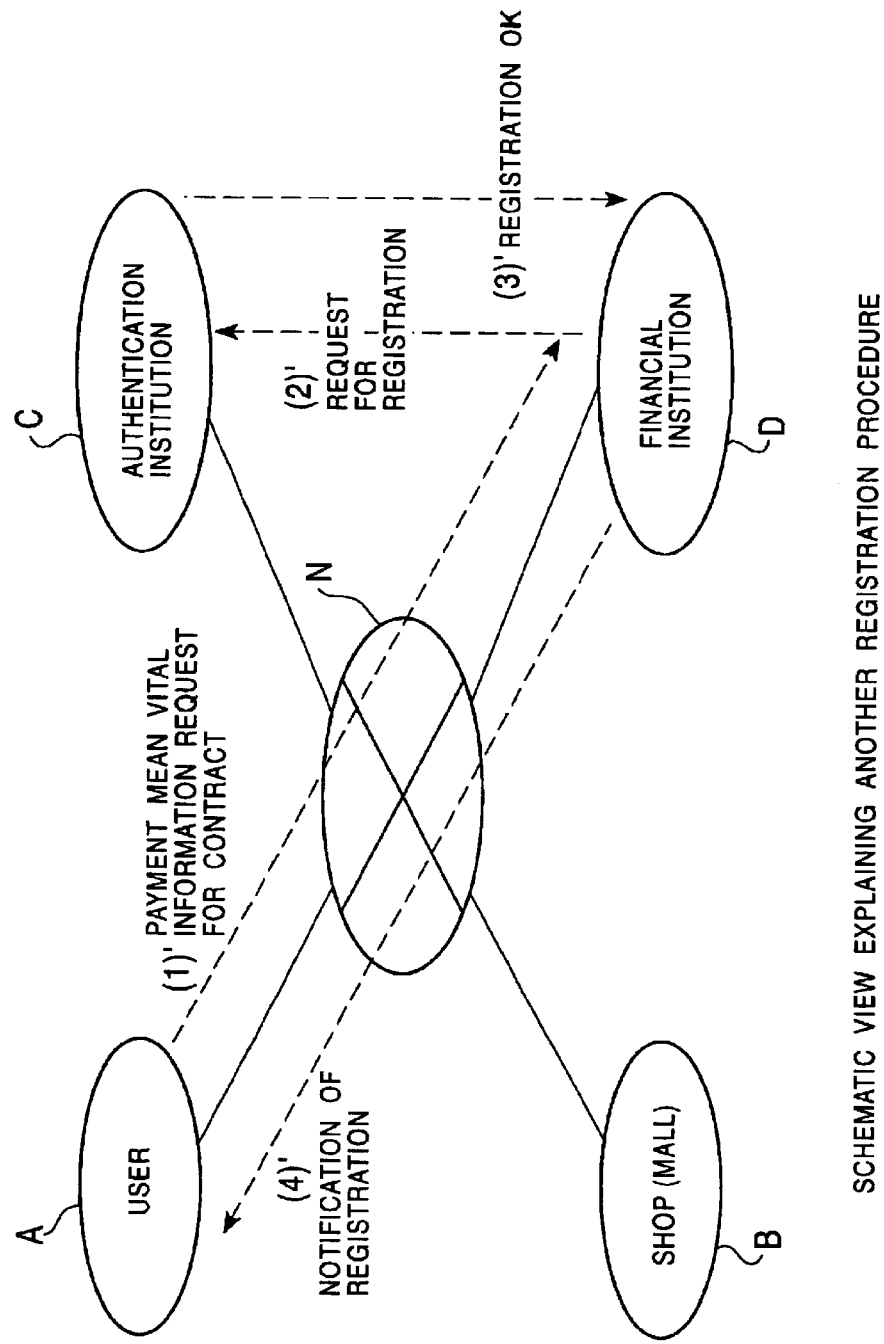

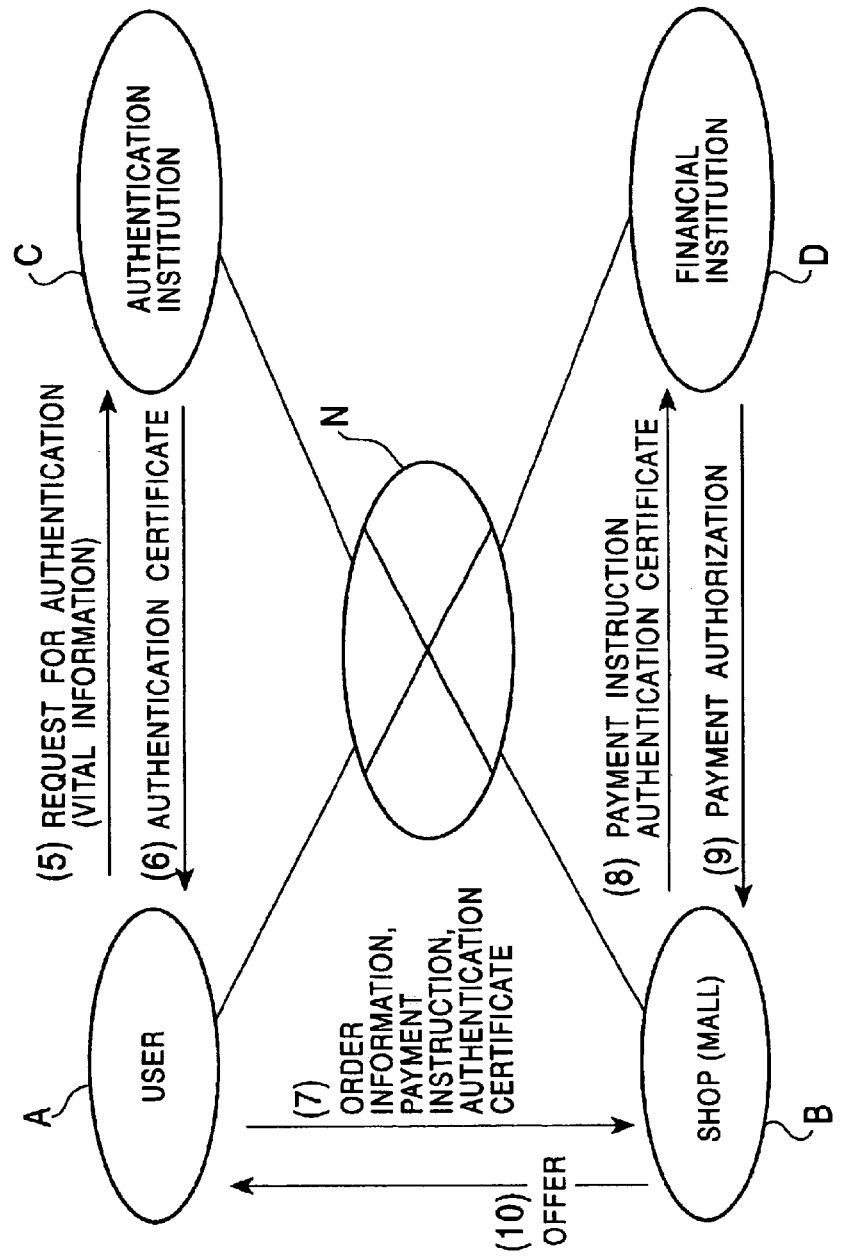

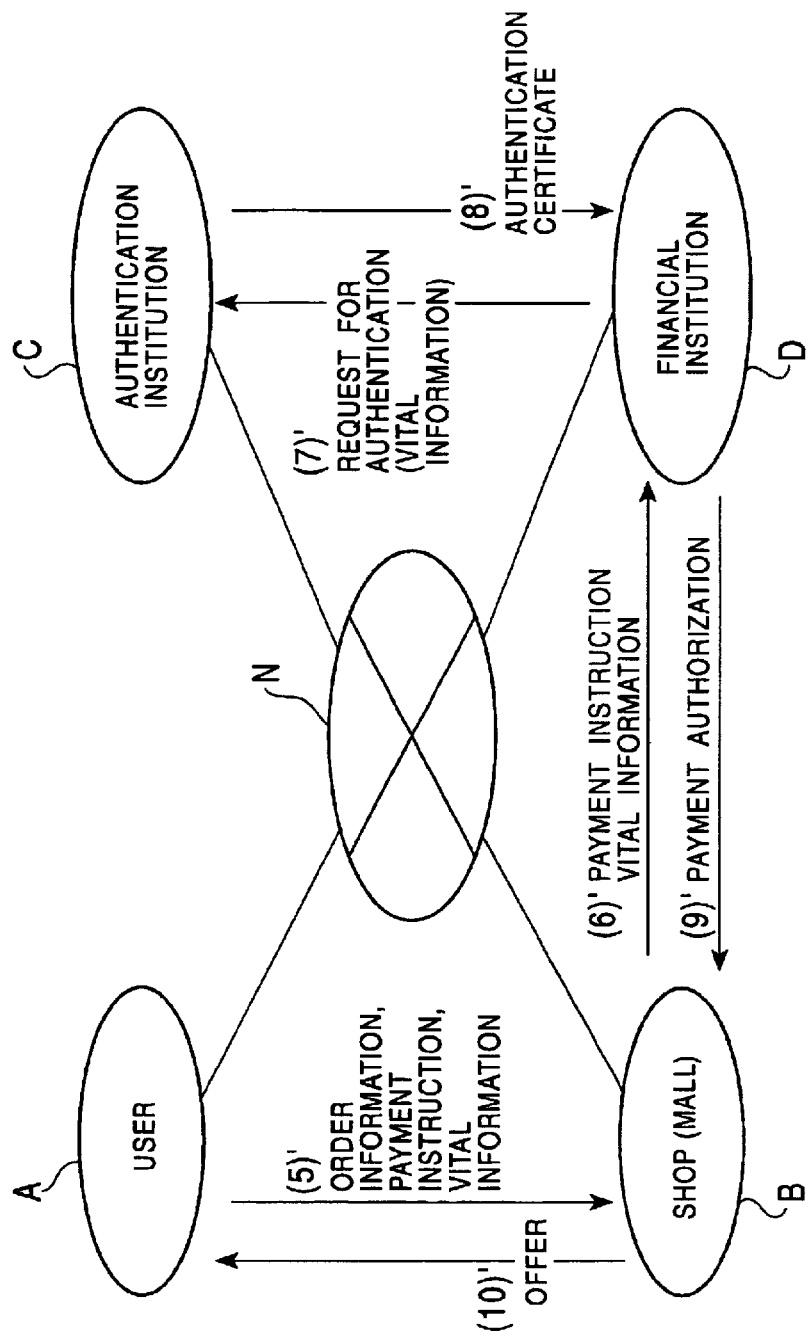

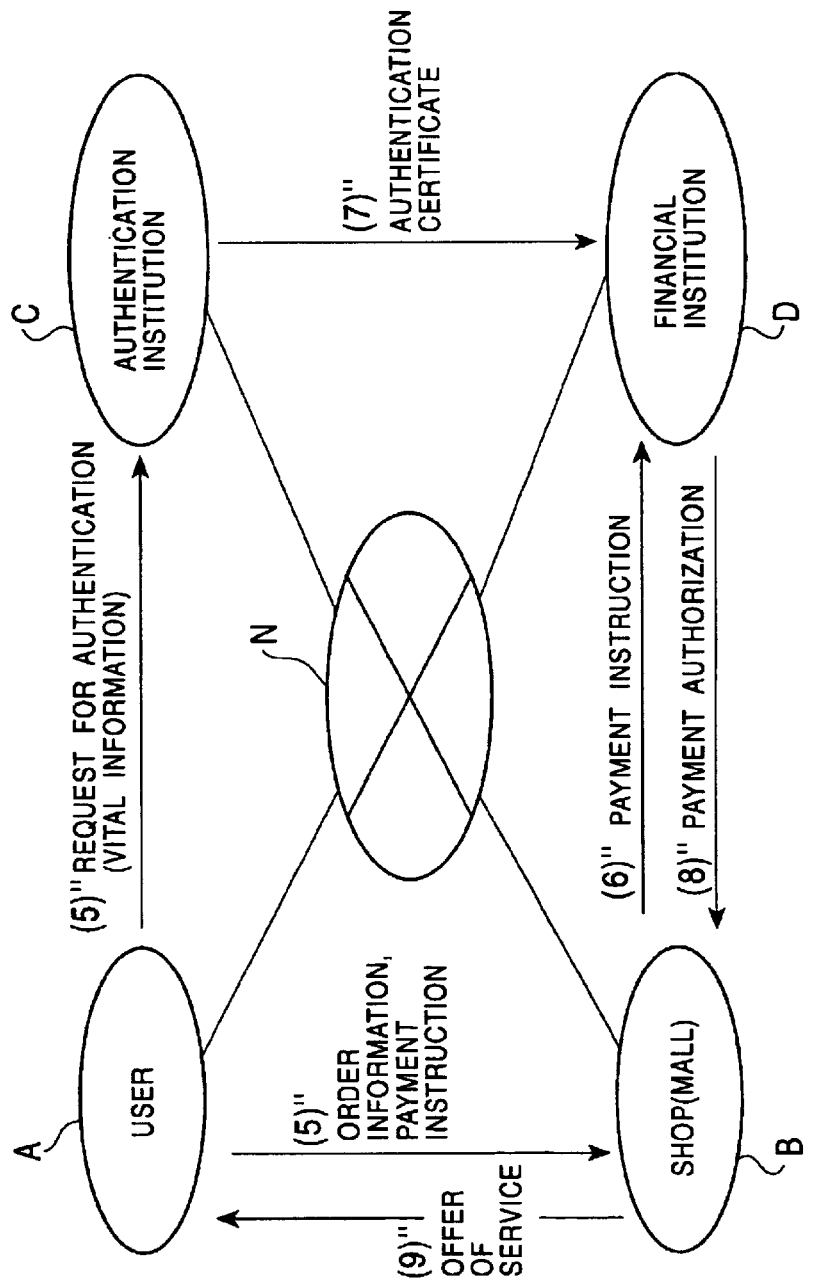

NETWORK SERVICE USER AUTHENTICATION SYSTEM

BACKGROUND OF THE INVENTION

1. Field of the Invention

The present invention relates to a network service user authentication system which performs an authentication of an authorized user by using vital information regarding the user in transmitting or receiving information through an open network.

2. Description of the Related Art

Recently, business transactions using open networks such as the Internet have been vigorously spreading and users can enjoy network services such as desired commodity purchasing transactions, securities transactions, information offering or the like using terminals such as personal computers or portable telephones. In such an environment, the users can receive targeted services without actually going out of their way to stores and hence can enjoy the availability that they are not restricted by time and places.

Contrary to such a convenient environment, however, in the open network, there exists a possibility of an illegal act in which an unauthorized third party receives a service or the like by disguising himself as a legitimate user. Accordingly, conventionally, as means for confirming the identity of a legitimate on authorized user, a system which uses a digital signature or an authentication certificate based on an open key/secret key cryptogram (hereinafter called "digital signature system") has been popularly used.

Although this digital signature system is a system which is highly effective in terms of security over the network, the user authentication only confirms a person who owns the authentication certificate and secret key and does not confirm whether the user is a genuinely authorized legitimate or not. Accordingly, there still exists a possibility that a third party can perform transactions by disguising himself as the authorized user.

OBJECT AND SUMMARY OF THE INVENTION

Accordingly, it is an object of the present invention to provide a user authentication system which can overcome the above-identified problem. That is, the user authentication system according to the present invention includes authentication means which preserves or stores vital information for confirming registered users and issues authentication information on the user by comparing vital information supplied from the outside through a network with the stored vital information, and payment allowing means which transmits the authentication information regarding the registered user issued by the authentication means to a provider which provides a network service to the user.

According to the present invention, since the vital information on the registered user is stored by the authentication means so as to provide an authentication of the registered user, at the time of providing the network service, the confirmation of the user as an authorized user can be performed based on the vital information. Accordingly, it is possible to provide the network service only to the registered user.

BRIEF DESCRIPTION OF THE DRAWINGS

FIG. 2 is a schematic view explaining other registering procedure of vital information.

FIG. 3 is a schematic view explaining the first transaction procedure.

FIG. 4 is a schematic view explaining the second transaction procedure.

FIG. 5 is a schematic view explaining the third transaction procedure.

DETAILED DESCRIPTION OF THE PREFERRED EMBODIMENTS

Figure 1:
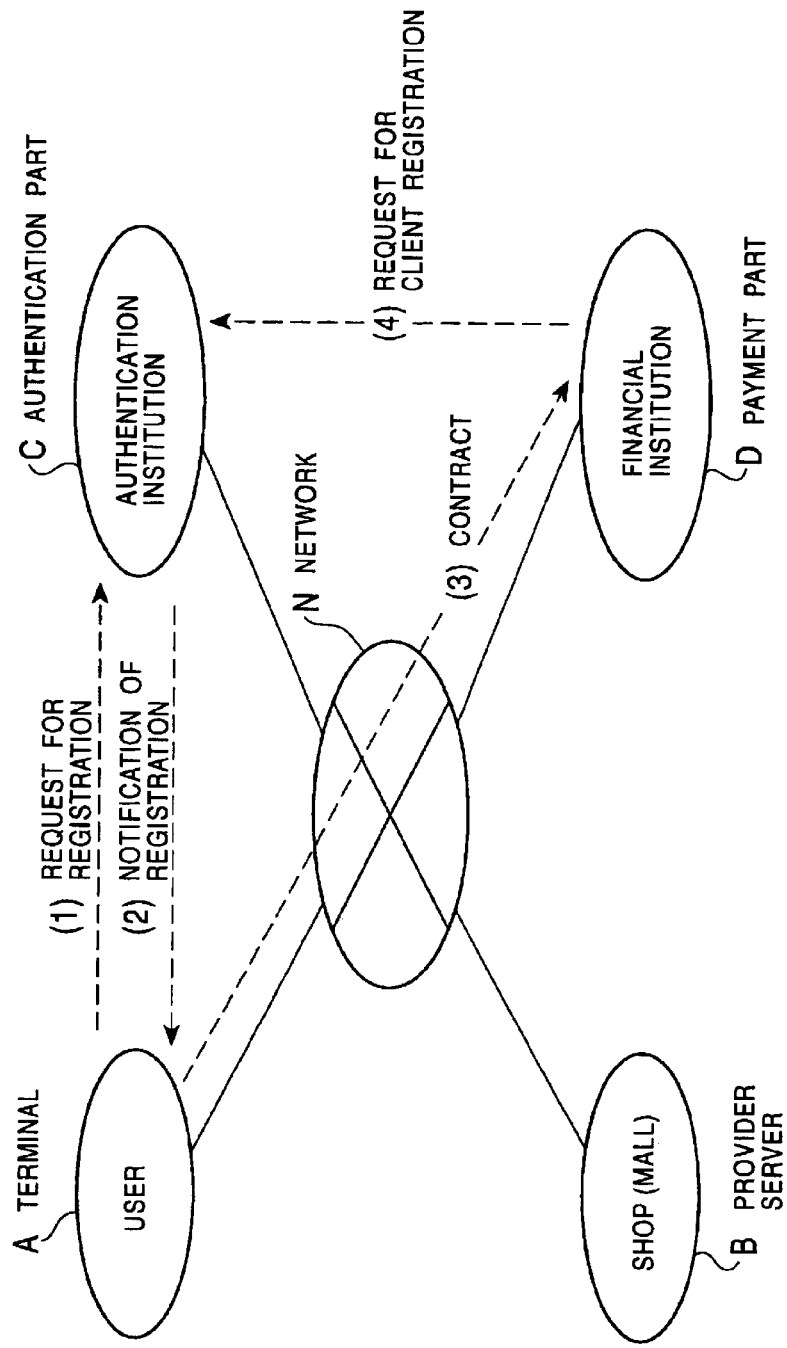
FIG. 1 is a schematic view explaining registering procedure of vital information.

An embodiment of the present invention is explained in detail hereinafter in conjunction with attached drawings. A network service user authentication system of this embodiment is characterized in that, in performing a transaction through a network, to identify a registered user with extremely high accuracy, vital information such as iris information, finger print, sonogram, complexion, retina information, shape of palm or the like which identifies only an aughorized user is used.

FIG. 1 is a schematic view explaining the registration procedure for the vital information. In this embodiment, assume a case in which, when a user transacts a purchase request through a network N, the identity of the user is confirmed at the time of payment. A system is constituted such that a terminal A which the user uses, a provider server B which a shop (mall) administrates, an authentication part C which an authentication institution administrates and a payment part D which a financial institution administrates are respectively connected to an open network N such as the Internet.

As the terminal A, a personal computer, a portable telephone, a portable terminal, a terminal installed at a convenience store or the like may be used by the user. Further, as the shop (mall), an actual mall or a virtual mall on the network N may provide the shopping service.

The authentication part C of the authentication institution is a server (authentication server) which stores and administrates vital information about the authorized user in a database based on the vital information for confirming the identity of an authorized user. The vital information is previously registered and issues authentication information of the user by comparing the vital information transmitted from the terminal A through the network N based on the vital information stored in the database.

It is preferable that the authentication institution is an institution independent from the user, the shop (mall) or the financial institution. With such a provision, the reliability of the authentication is sufficiently ensured. By providing such an authentication institution over the network N, the registered user can receive the confirmation service of the registered user in real time from a remote place through the network N.

Upon receiving the authentication information on the user issued from the authentication part C of the authentication institution, the payment part D of the financial institution (payment gateway) is granted permission to make payment of an amount to be paid to the shop (mall).

The registration of the vital information (registration of the user) which is performed prior to the user conducting the transaction through the network N is explained. First of all, the user provides the vital information as electronic data using a vital information acquisition device (not shown in the drawing) and submits this vital information and personal information (name, address or the like) from the terminal A to the authentication part C of the authentication institution through the network N ((1) request for registration).

Here, the vital information acquisition device is not always necessarily connected to the terminal A of the user. That is, the registered user may go to a place where the vital information acquisition device is installed and may read the vital information into the terminal A after providing the vital information as electronic data. Further, a vital information acquisition device which the authentication institution, the shop (mall), the financial institution or an institution other than these institutions administrative may be remote installation such as a company, school, station, convenience store or the like and the vital information on the user may be acquired at such remote location.

Upon receiving the request for registration of the user transmitted through the network N, the authentication part C of the authentication institution registers the vital information and the personal information in the database in a manner that the vital information and the personal information are related with each other. Upon completion of the registration, the authentication part C of the authentication institution performs the notification of the completion of the registration to the terminal A of the user through the network N ((2) notification of registration).

Subsequently, the user transmits the registration completion notification received from the authentication institution to the payment part D of the financial institution and simultaneously makes an application for the manner of payment ((3) contract). The financial institution examines the content of the registration completion notification. When no problem is found, the financial institution performs the registration which identifies the user as a client of the financial institution in the authentication part C of the authentication institution ((4) request for client registration). The user registration is completed in this manner.

The registration of the user may be performed with the procedure shown in FIG. 2 which is a schematic view. First of all, the user provides the vital information as electronic data using the vital information acquisition device (not shown in the drawing) and submits this vital information and personal information (name, address or the like) from the terminal A to the payment part D of the financial institution through the network N ((1') request for contract).

Subsequently, the financial institution determines whether the request is correct or not. If the request is determined to be correct, the financial institution transmits the vital information and the personal information of the user to the authentication part C of the authentication institution and requests the registration of the vital information and the registration that the user is the client of the financial institution. ((2') request for registration).

Upon receiving this request for registration, the authentication part C of the authentication institution admits the registration and thereafter registers the correspondence between the vital information and the personal information of the user in the database. Upon completion of the registration, the authentication part C of the authentication institution transmits the notification of the completion of registration to the financial institution ((3') registration OK).

Upon receiving approval of the notification of registration from the authentication institution, the financial institution transmits the notification to the terminal A of the user that the registration is completed. ((4') notification of registration).

Subsequently, the procedure of performing the actual transaction on the network is explained. FIG. 3 is a schematic view explaining the first transaction procedure. First of all, in performing the transaction through the network N, for example, the user provides the vital information using the vital acquisition device (not shown in the drawing) connected to the terminal A and thereafter submits, the request for authentication of the vital information together with the information of the financial institution to the authentication part C of the authentication institution through the network N ((5) request for authentication).

In compliance with the request for authentication transmitted from the user, the authentication part C of the authentication institution collates the transmitted vital information with the vital information previously registered in the database and determines whether the request is genuinely a request from the authorized user. If the collation correctly confirms the identity of the user, the authentication certificate is transmitted to the terminal A of the user through the network N ((6) authentication certificate). This authentication certificate is encrypted such that it is decrypted only at the payment part D of the financial institution to which the authentication certificate is later submitted (this encryption being performed using an existing digital signature system).

Subsequently, the user consults information about commodities and services stored in a server of a provider B of a shop (mall) through the network N and makes a decision about a transaction. Then, the user transmits the order information and the payment instruction of the transaction together with the authentication certificate to a provider server B of the shop (mall) ((7) order information, payment instruction, authentication certificate). Except for the order information, the other information is also encrypted as in the case of the authentication certificate so that the other information is decrypted only at the payment part D of the financial institution to which the other information is transmitted.

The provider server B of the shop (mall) transmits the payment instruction and the authentication certificate to the payment part D of the designated financial institution through the network N to confirm the reception of the order information transmitted from the user and the payment. ((8') payment instruction, authentication certificate).

Upon receiving the payment instruction and the authentication certificate transmitted from the shop (mall), the payment part D of the financial institution confirms the accuracy of the content. If no problem is found, the payment part D of the financial institution transmits the payment authorization to the provider server B of the shop (mall) ((9) payment admission).

Upon receiving the payment authorization from the payment part D of the financial institution, the shop (mall) accepts a given order ((10) offer) from the user. By performing the transaction through the network N in accordance with such a procedure, the authentication of the authorized user can be determined based on the vital information of the user so that the transaction can be completed after positively confirming that the user is the authorized user.

Subsequently, a second transaction sequence is explained in conjunction with a schematic view of FIG. 4. Here, assume that the registration of the user, which the user previouly completed, is completed in accordance with the procedure shown in FIG. 1 or FIG. 2. First of all, the user consults information on commodities or services stored in a provider server B of a shop (mall) through the network N and decides on a transaction.

Then, in performing the transaction through the network N the user provides the vital information from the vital information acquisition device (not shown in the drawing)

connected to the terminal A. Thereafter, the user encrypts the vital information, which can be decrypted only by the authentication part C of the authentication institution, and transmits the encrypted vital information together with the order information, and the payment instruction to the provider server B of the shop (mall) ((5') order information, payment instruction, vital information).

Subsequently, the provider server B of the shop (mall) accepts the order information from the terminal A of the user and transmits the payment instruction and the vital information to a designated financial institution to confirm the payment ((6') payment instruction, vital information).

Upon receiving the payment instruction and the vital information from the provider server B of the shop (mall), the payment part D of the financial institution transmits the vital information to the authentication part C of the authentication institution through the network N and requests the authentication ((7) request for authentication).

In compliance with the request for authentication transmitted from the payment part D of the financial institution, the authentication part C of the authentication institution compares the transmitted vital information with the vital information previously registered in the database and determines whether the vital information is genuinely the vital information from the authorized user. When the comparison is obtained, the authentication certificate is transmitted to the payment part D of the financial institution ((8') authentication certificate).

Upon receiving the authentication certificate transmitted from the authentication part C of the authentication institution, the payment part D of the financial institution confirms the accuracy of the authentication certificate and the payment instruction. If no problem is found, the payment part D of the financial institution transmits the payment admission to the provider server B of the shop (mall) ((9') payment admission).

Upon receiving the payment admission from the payment part D of the financial institution, the shop (mall) accepts a given order ((10) offer) from the user. By performing the transaction through the network N in accordance with such a procedure, the authentication of the user can be performed based on the vital information of the user so that the transaction can be completed after positively confirming the user is the authorized user. Further, according to the second transaction procedure, when the user conducts the transaction through the network N, it is unnecessary for the user to connect, through the network, with the authentication institution. That is, it is sufficient for the user to establish the network connection only with the provider server B of the shop (mall).

The third transaction sequence is explained in conjunction with a schematic view of FIG. 5. Here, assume that the registration of the user, which the user has previously performed is performed in accordance with the procedure shown in FIG. 1 or FIG. 2. First of all, the user consults information about commodities or services stored in the provider server B of the shop (mall) through the network N and decides on a transaction.

Then, in performing the transaction through the network N, the user provides the vital information from a vital information acquisition device (not shown in the drawing) connected to the terminal A. Thereafter, the user transmits the vital information together with information on the financial institution, to which the vital information has been submitted, to the authentication part C of the authentication institution. ((5") request for authentication). Further, the user simultaneously transmits the order information and the payment instruction to the provider server B of the shop (mall) ((5") order information, payment instruction).

Subsequently, the provider server B of the shop (mall) accepts the order information from the terminal A of the user and transmits the payment instruction and the vital information to a designated financial institution to confirm the payment ((6") payment instruction, vital information). Simultaneously, in compliance with the request for authentication transmitted from the terminal A of the user, the authentication part C of the authentication institution compares the transmitted vital information with the vital information previously registered in the database and determines whether the vital information is genuinely the vital information from the authorized user. When the comparison is verified, the authentication certificate is transmitted to the payment part D of the financial institution ((7") authentication certificate).

Upon receiving the payment instruction transmitted from the shop (mall) and the authentication certificate transmitted from the authentication institution, the payment part D of the financial institution confirms the accuracy of the payment instruction and the authentication certificate. If no problem is found, the payment part D of the financial institution transmits the payment authorization to the provider server B of the shop (mall) ((8") payment admission).

Upon receiving the payment authorization from the payment part D of the financial institution, the shop (mall) accepts a given order ((10) offer) from the user. By conducting the transaction through the network N in accordance with such a procedure, the authentication of the user can be performed based on the user's vital information so that the transaction can be completed after positively confirming the user is the authorized user. Further, according to the third transaction procedure, when the user conduts the transaction through the network N, since the order to the shop (mall) and the request for authentication to the authentication institution can be simultaneously transmitted, the authentication of the user and the transaction through the network N can be quickly conducted.

Although the case in which the transaction is conducted between the user and the shop (mall) has been explained in the above-discussed embodiment, the present invention is also applicable to Internet banking in which the user and the financial institution directly conduct a transaction. In this case, the role of the shop (mall), explained previously, is performed by the financial institution per se. Further, the present invention is also applicable to a mode of transaction in which the provider of commodities or the like is not a shop (mall) and the transaction is conducted between individuals (free market on the Internet, for example).

As has been explained heretofore, according to the user authentication system of the present invention, the following advantageous effects can be obtained. That is, since vital information about the user is used for authentication of the user, it is possible to accurately confirm the identity of an authorized user at the time of conducting a transaction. Accordingly, there is no fear that another person can disguise himself as the authorized user and the authorized user can safely conduct a transaction through the network. Further, since monetary loss caused when an another person disguises himself as the authorized user can be eliminated, the shop (mall) or the financial institution can safely conduct a transaction over a network.

What is claimed is:

1. A user authentication system comprising authentication means for storing vital information about a user, confirming identity of a user and issuing authentication information on the user by comparing vital information about the user supplied through a network with the stored vital information, and payment means which, upon receiving authentication information on the user issued by the authentication means, transmits the payment authorization for allowing the user to pay through the network to a provider which provides a network service to the user.

2. A user authentication system according to claim 1, wherein the authentication means obtains the vital information from the user who Is to be registered through the network and conducts registration of the user by establishing correspondence between the vital information and the user.

3. A user authentication system according to claim 1, wherein, when the user is a qualified payer, the payment means performs a notification to the authentication means through the network that the user is the qualified payer.

4. A user authentication system according to claim 2, wherein the payment means obtains the vital information about the user from the user through the network, confirms that the user is a qualified payer and transmits the confirmation of qualified payer and the vital information to the authentication means through the network, and requests registration of the user.

5. A user authentication system according to claim 1, wherein, when the user receives an offer of a commodity or a service from the provider, the authentication means receives the vital information on the user from the user and transmits the authentication information to the user.

6. A user authentication system according to claim 1, wherein, when the user receives an offer of a commodity or a service from the provider, the authentication means receives the vital information on the user from the transmission means and transmits the authentication information to the payment means.

7. A user authentication system according to claim 1, wherein, when the user receives an offer of a commodity or a service from the provider, the authentication means receives the vital information on the user from the user and transmits the authentication information to the payment means.

* * * * *